United States Patent [19]
Reilly

[11] 3,868,143
[45] Feb. 25, 1975

[54] CRASH LOAD ATTENUATING TROOP SEAT

[75] Inventor: Mason J. Reilly, Media, Pa.

[73] Assignee: The Unites States of America as represented by the Secretary of the Navy, Washington, D.C.

[22] Filed: Apr. 25, 1973

[21] Appl. No.: 354,425

[52] U.S. Cl. .............. 297/216, 297/385, 297/457
[51] Int. Cl. ............................................ B60r 21/10
[58] Field of Search ........... 297/216, 457, 385; 5/9; 248/361 A; 16/67

[56] References Cited
UNITED STATES PATENTS

| | | | |
|---|---|---|---|
| 2,442,375 | 6/1948 | Paxton | 297/216 X |
| 2,556,076 | 6/1951 | Evans et al. | 297/457 X |
| 2,639,913 | 5/1953 | Reynolds | 297/216 X |
| 2,756,693 | 7/1956 | Frost | 248/361 A X |
| 2,829,702 | 4/1958 | Keating | 297/457 X |
| 3,143,773 | 8/1964 | Glenn | 16/67 X |
| 3,314,720 | 4/1967 | Millington et al. | 297/216 X |
| 3,480,241 | 11/1969 | Moyer | 248/361 A X |

Primary Examiner—Roy D. Frazier
Assistant Examiner—Peter A. Aschenbrenner
Attorney, Agent, or Firm—R. S. Sciascia; Henry Hansen

[57] ABSTRACT

A lightweight, low cost, collapsible, side-facing seat construction for troop carrying aircraft designed to attenuate crash load forces in an improved manner. A fabric seat sling depending from a support strap assembly is suspended via energy absorbing devices from an aircraft overhead frame structure and is supported by a simple pivoted strut assembly secured to the aircraft floor structure. Shoulder and lap safety belts are secured through the seat by tie-down straps angled outwardly from both sides of the seat directly to the aircraft floor for increased occupant safety and anti-sway resistance. A minimum of rigid, heavy, relatively expensive compressive-carrying structural members is thus utilized in this unique seat while providing maximum comfort and safety to its occupant.

9 Claims, 7 Drawing Figures

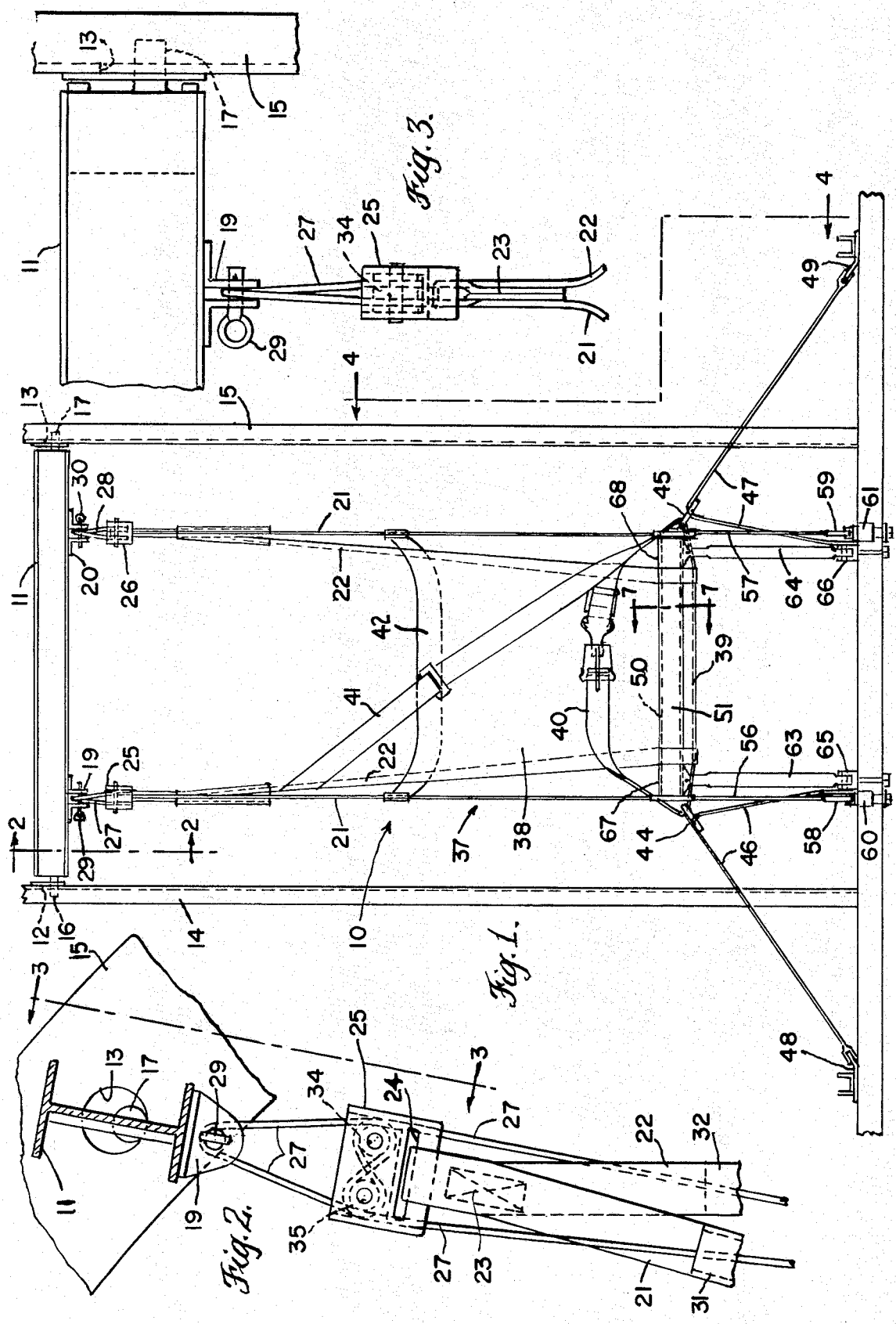

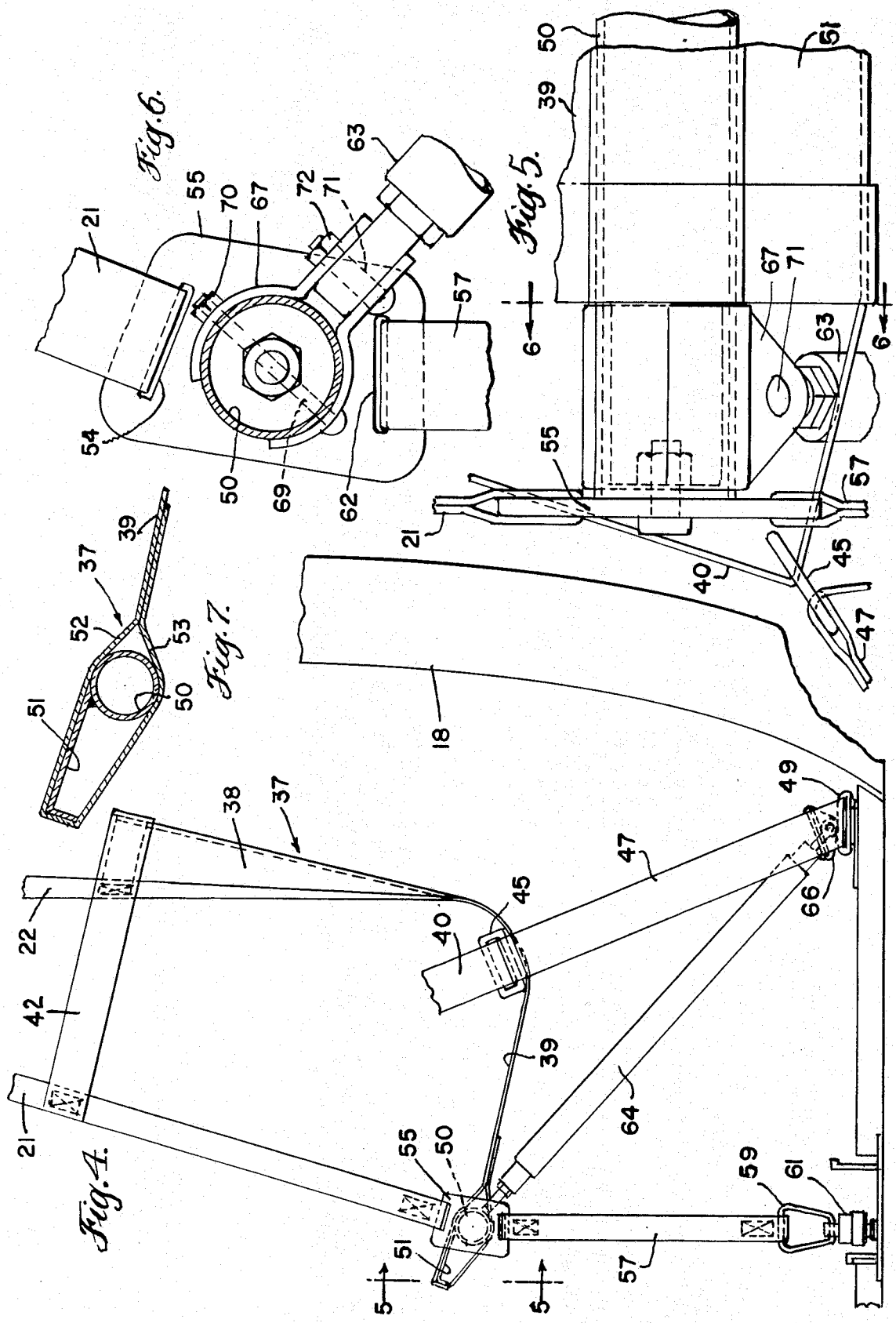

3,868,143

CRASH LOAD ATTENUATING TROOP SEAT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of chairs and seats and more particularly to an improved crash load attenuating seat.

Energy attenuation as applied to personnel in aircraft crash situations is accomplished by decelerating the personnel at a slower rate than the surrounding aircraft structure, meaning that the seat must be free to move in the direction it is being decelerated. The seat must also contain an energy absorbing device for controlled deceleration. Existing troop seats provide relatively little personnel survivability features for aircraft hard landings or potentially survivable crashes. Weight and cost restrictions have prohibited the use of stronger troop seats or energy attenuating troop seats of conventional design. The prior art reveals several types of seats including some which are completely non-rigid and collapsible but do not contain energy absorbing means or integral seat tie-down into the structure producing increased stability, and others which have a rigid seat pan hinged to the structure and energy absorbing means but also lack integral seat tiedown.

SUMMARY OF THE INVENTION

Accordingly, it is a general purpose and object of the present invention to provide a novel, improved, lightweight, low cost crash load attenuating seat. It is a further object to provide a seat having improved stability in all directions due to integral tie-down into the structure. It is another object to provide a seat having simple and inexpensive energy absorbing means.

These and other objects are accomplished according to the present invention by a seat comprising a fabric sling suspended by straps at the front and rear from a beam pivotally supported at its ends by an aircraft structure. The seat sling comprises an upper and a lower portion for supporting the back and buttocks, respectively, the lower portion being looped around a spreader tube for shape retention of the fabric sling, the tube being pivotally connected at each end to respective struts, pivotally and slidably mounted to the floor of the aircraft for freedom of lateral movement and seat stability in the vertical and fore to aft directions. The spreader tube is further stabilized by a pair of holddown cables connected to the ends thereof and to the floor by quick-disconnect fittings. A lap safety belt is secured through the fabric seat pan to the floor of the aircraft by safety belt tie-downs for seat stability in a lateral direction. A shoulder harness is attached at a lower end to the safety belt and at an upper end to a rear suspension strap. The suspension straps are attached to the overhead structure by a compact wire bending type energy attenuator.

BRIEF DESCRIPTION OF THE DRAWINGS

FIG. 1 is a front elevational view of a troop seat constructed in accordance with the invention;

FIG. 2 is an enlarged cross-sectional view taken on the line 2—2 of FIG. 1;

FIG. 3 is an elevational view looking in the direction indicated by the arrows 3-3 in FIG. 2;

FIG. 4 is an enlarged fragmentary side view looking in the direction indicated by the arrows 4—4 in FIG. 1;

FIG. 5 is an enlarged fragmentary detailed view of seat spreader tube and associated parts, the view being taken as indicated by the arrows 5-5 in FIG. 4;

FIG. 6 is a cross-sectional view taken on the line 6—6 of FIG. 5; and

FIG. 7 is a cross-sectional view taken on the line 7—7 of FIG. 1.

DESCRIPTION OF THE PREFERRED EMBODIMENT

Referring to FIGS. 1 – 4, inclusive, a seat 10 facing transverse to the direction of motion in an aircraft is suspended from an overhead beam 11, such as an I-beam, which is supported through respective openings 12 and 13 in aircraft frames 14 and 15 on a bulkhead 18 (FIG. 4) by a pair of support fittings 16 and 17 attached to the ends of beam 11. Fittings 16 and 17 allow beam 11 to rotate and align itself with the load, preventing a moment from being applied to frames 14 and 15. A pair of clevis brackets 19 and 20 are appropriately fastened to beam 11, such as by welding, providing overhead support connection points for seat 10. A front support strap 21 and a back support strap 22 on each side of seat 10 are sewn together at their common end 23, which end is looped through openings 24 in respective attenuator assemblies 25 and 26. Assemblies 25 and 26 depend from brackets 19 and 20 respectively by tensioned guy wires 27 and 28 which are looped around quick-disconnect or pop pins 29 and 30 slidably inserted into brackets 19 and 20. Pins 29 and 30 can be easily removed to disconnect seat 10 from beam 11 for storage or for ready access to a window or escape hatch through bulkhead 18.

Referring specifically to FIG. 2, wherein the cooperation between wire 27 and attenuator assembly 25 is shown in greater detail, wire 27 is bent around rods 34 and 35 juxtapositioned in a horizontal plane in a crossover or figure eight pattern. The respective ends of wire 27 fit into a pair of pockets 31 and 32 sewn into respective straps 21 and 22 to guard against the ends possibly injuring an occupant in seat 10. Energy is absorbed by doing work in bending wire 27 over and under rods 34 and 35 upon sudden impact loading in a vertical direction on straps 21 and 22. Compactness is accomplished by utilizing a single axis for wire to make a double pass.

Referring now to FIGS. 1 and 4, seat 10 includes a fabric sling 37 having an upper portion 38 for supporting the back of an occupant and a lower portion 39 for supporting the buttocks. Sling 37 is preferably made out of nylon, canvas or any other appropriate flexible material. Support straps 21 and 22 are sewn or otherwise suitably connected to the respective upper 38 and lower 39 portions of sling 37 on both sides for vertical support.

Referring now to FIGS. 4, 5 and 6, front support straps 21 are respectively attached intermediate their ends to the ends of a webbing 42 connected, such as by sewing to upper sling portion 38 across the top edge thereof. The bottom ends of straps 21 are respectively looped around an opening 54 in a fitting 55 rotatably fixed to each end of a rigid spreader tube 50 as shown in detail in FIG. 6, and sewn. Back support straps 22 are respectively attached intermediate their ends to webbing 42 at two places intermediate its end, such as by sewing.

A lap safety belt 40 is fastened to the lower end of a shoulder harness 41 by some convenient manner, such as by sewing, the other end of harness 41 being attached diagonally across seat 10 at the upper end to one of the back support straps 22. Belt 40 is continuous around lower sling portion 39 and is attached on either side through respective buckles 44 and 45 to respective tie-down straps 46 and 47. Straps 46 and 47 are connected to their respective one ends to fittings 48 and 49 attached at oblique angles to the aircraft floor outwardly from the sides of tube 50 an amount sufficient to provide anti-sway, lateral stability in the most likely direction of impact, the direction of aircraft motion. The other ends of straps 46 and 47 are connected to fittings 65 and 66 attached to the aircraft floor directly beneath the ends of tube 50. By securing safety belt 40 directly to the aircraft structure in the manner described, rather than simply to the seat, increased occupant safety is achieved. In the present configuration the entire seat including its occupant is restrained from lateral swaying motion upon crash impact in the forward direction of aircraft motion by the outwardly angled floor tie-downs. By simply attaching the lap and shoulder safety straps to the seat, as in other conventional designs, the seat has a tendency to separate from the structure and become a dynamic missile with its occupant still fastened therein. The present unique configuration therefore provides a definite improvement over conventional design.

The forward end of lower sling portion 39 is looped and sewn together to form a passageway for accepting spreader tube 50 having a rigid thigh pressure pad 51 integrally attached thereto in some convenient manner, such as by welding. Referring to FIG. 7, the details of the manner in which fabric sling 37 is looped around tube 50 and pad 51 are shown more clearly. Separate layers 52 and 53 of fabric are looped around the combination of tube 50 and pad 51 and are joined together by sewing in lower portion 39 area.

Referring now to FIGS. 4, 5 and 6, tube 50, and thus sling 37 attached thereto are secured to the aircraft floor by straps 56 and 57 which are looped and sewn around openings 62 in fittings 55 at the respective one end of the straps and at the other end around rings 58 and 59 pivotally secured to any conventional quick-disconnect fittings 60 and 61 removable from the aircraft floor for easy stowage of the seat against aircraft bulkhead 18.

Referring to FIGS. 1, 4, 5 and 6, rigid struts 63 and 64 are respectively connected to each end of tube 50 and pivotally connected to the aircraft floor through fittings 65 and 66. Conventional ball and socket joints are provided at the connection of struts 63 and 64 to the floor allowing seat 10 to move freely sideways. Upon crash impact, seat 10 is free to move downward and forward under crash impact loads and acceleration, rotating in a counterclockwise direction about struts 63 and 64. Referring particularly to FIG. 6, strut 63 is connected to one end of tube 50 by a clevis fitting 67 fastened to tube 50 in any convenient manner, such as by bolt 69 and nut 70 and fastened to strut 63 by bolt 71 and nut 72. Strut 64 is similarly fastened at the other end of tube 50.

Some of the many advantages of the present invention should now be readily apparent. The seat is light in weight, much of the heavier rigid frame construction of conventional troop seats having been replaced by lightweight flexible webbing and support straps. Lap belt and shoulder harness loads are carried directly into the floor structure rather than into the seat structure for increased occupant safety and anti-sway stability in the direction of aircraft motion. Additional stability in the fore and aft direction is afforded by securing both sides of the seat to the floor via pivotable struts. The design is low in cost utilizing relatively low cost fabric versus the most costly fabricated metal parts, and a relatively inexpensive energy attenuator. Seat integrity under crash loads is improved by reducing crash impulse loads by as much as 60 percent both due to the method of suspending the seat from the aircraft crown structure rather than supporting it on the floor, and the particular type of energy attenuators used.

Obviously many modifications and variations of the present invention are possible in light of the above teachings. It is therefore to be understood that within the scope of the appended claims the invention may be practiced otherwise than as specifically described.

What is claimed is:

1. A collapsible safety seat for a vehicle comprising:
    a beam formed to be pivotally supported by the vehicle structure along the length thereof;
    a pair of rigid struts formed at respective one ends thereof to be pivotally attached to the vehicle floor at a spaced interval beneath said beam;
    a rigid member connected between the other ends of said struts;
    a pair of flexible suspenders connected between the respective ends of said beam and said member;
    a webbing attached at each end intermediate the ends of respective ones of said suspenders;
    a flexible sling having upper and lower portions for supporting the back and buttocks, respectively, of an occupant, said upper portion being attached to said webbing and said lower portion being attached to said member;
    a pair of tie-down straps formed to be attached at respective one ends thereof to the vehicle floor in a vicinity beneath said member and at respective other ends thereof to the vehicle floor outwardly from the ends of said member; and
    a lap belt formed to encompass said lower sling portion and attached at respective sides thereof to said tie-down straps adjacent to the sides of said lower sling portion.

2. A seat as set forth in claim 1 further comprising:
    a shoulder harness strap attached at one end thereof to one end of said lap belt and at the other end thereof diagonally across said upper sling portion to one of said suspenders.

3. A seat as set forth in claim 2 further comprising:
    a pair of energy absorbers operatively connected between respective ones of said suspenders and said beam for absorbing vehicle impact energy.

4. A seat as set forth in claim 3 further comprising:
    first quick-disconnect means operatively connected between said beam and said suspenders for disconnecting the seat from the vehicle overhead structure.

5. A seat as set forth in claim 4 further comprising:
    a pair of vertical straps attached at respective one ends thereof to the ends of said member and formed to be attached to the vehicle floor beneath said member.

6. A seat as set forth in claim 5 further comprising:
second quick-disconnect means operatively connected between said vertical straps and the vehicle floor for disconnecting the seat from the vehicle floor.

7. A seat as set forth in claim 3 wherein:
each of said energy absorbers includes a support connected to one of said suspenders, first and second pins connected in parallel to said support, and a deformable rod connected to said beam and looped under said first pin and over said second pin.

8. A seat as set forth in claim 1 further comprising:
a pair of energy absorbers operatively connected between respective ones of said suspenders and said beam for absorbing vehicle impact energy.

9. A seat as set forth in claim 8 wherein:
each of said energy absorbers includes a support connected to one of said suspenders, first and second pins connected in parallel to said support, and a deformable rod connected to said beam and looped under said first pin and over said second pin.

* * * * *